J. S. Bullard,
Boring Butter Molds.
Nº 43,092.        Patented June 14, 1864.

Witnesses
W. H. Burridge
A. W. McClelland

Inventor
John S. Bullard

UNITED STATES PATENT OFFICE.

JOHN S. BULLARD, OF CHAGRIN FALLS, OHIO.

IMPROVEMENT IN TOOLS FOR BORING BUTTER-MOLDS.

Specification forming part of Letters Patent No. 43,092, dated June 14, 1864.

*To all whom it may concern:*

Be it known that I, J. S. BULLARD, of Chagrin Falls, in the county of Cuyahoga and State of Ohio, have invented a new and Improved Tool for Boring Butter-Molds; and I do hereby declare that the following is a full and complete description of the construction and operation of the same, reference being had to the accompanying drawings, making a part of this specification, in which—

Figure 1:
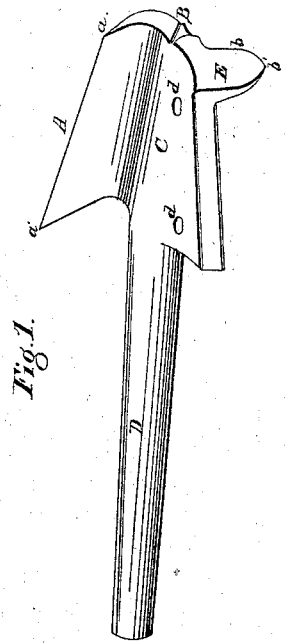
Figure 2:
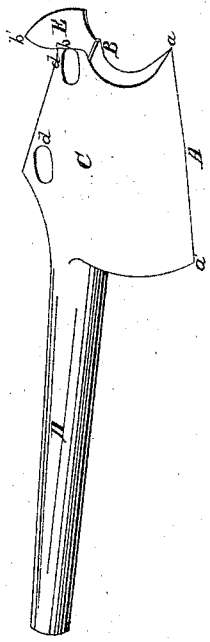
Figure 4:
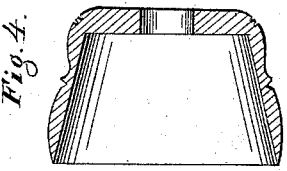
Figure 3:
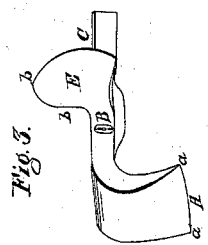

Figures 1 and 2 are perspective views of the tool, of which Fig. 3 is an end view, and Fig. 4 is a vertical section of the butter-mold.

Like letters of reference denote like parts in the several figures.

My improvement relates to a tool by which molds are bored out in the most desirable manner at one operation.

Figs. 1 and 2 represent the tool, Fig. 1 being a view of one side and Fig. 2 of the other side. It may be formed in one entire piece of steel.

A represents the cutting-edge on one side of the tool, which is inclined outward from $a$ to $a'$—that is, the tool operating from the projecting and central point, B, the end $a'$ will describe a greater circle than the end $a$. The tool is curved from this cutting edge, being curved round more toward the end $a$, and is formed into the flat piece C, which terminates about the center in the shank D. On the end of the tool, at the side opposite from the edge A, is formed the lip E, which has a curved cutting-edge, $b$, from about the center of the tool to the point $b'$, that operates in connection with the cutting-edge A on the side. The distance from the center B to the point $b'$ of the lip is about equal or a little more than the distance from B to $a$ of the cutting edge, as represented in Fig. 3.

$d\ d$ are holes for securing a lip to the tool should the lip E get broken off in any way.

The manner in which this tool operates in boring molds is as follows: After the block to form the mold is roughed out, it is chucked to the live mandrel of the head-block of the lathe. The dead-center of the mandrel of the foot-block is centered in the shank of the tool, the tool being in such a position that the projecting point B will come in the center of the block. The block is then made to revolve, while the tool is moved up by the mandrel of the foot-block, cutting round and round, boring out the inside in the most uniform manner until it is finished, as represented in Fig. 4, the distance across the bottom inside being equal to the distance across the end of the tool from $a$ to $b'$. The lip E cuts the bottom round smoothly, and the edge A the sides, making them the desired taper, as the edge A cuts outward from $a$ to $a'$ when operated from a direct center, as described. By putting the shank eccentric, or one side of the center, the sides of the mold can be bored straight.

Butter-molds have usually been bored out by a book, requiring many operations and movements, but with this tool they are cut out in the most uniform manner, and entirely finished by one operation. The block, after being bored out as described, can be turned into the desired form outside and finished in the ordinary manner. The holes $d\ d$ are not essential to the working of the tool, but only for the purpose hereinbefore stated.

What I claim, and desire to secure by Letters Patent as my improvement, is—

The above-described boring-tool when constructed and applied to the purpose substantially as set forth.

JOHN S. BULLARD.

Witnesses:
W. H. BURRIDGE,
A. W. McCLELLAND.